UNITED STATES PATENT OFFICE.

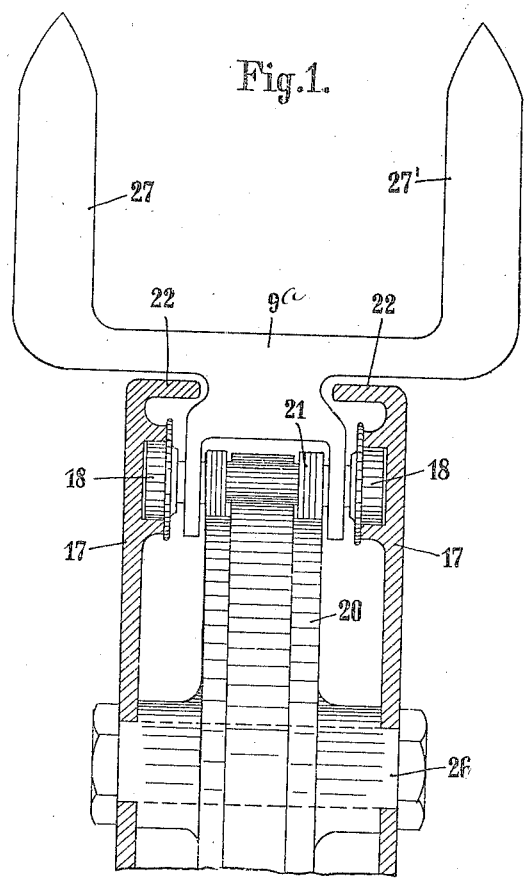

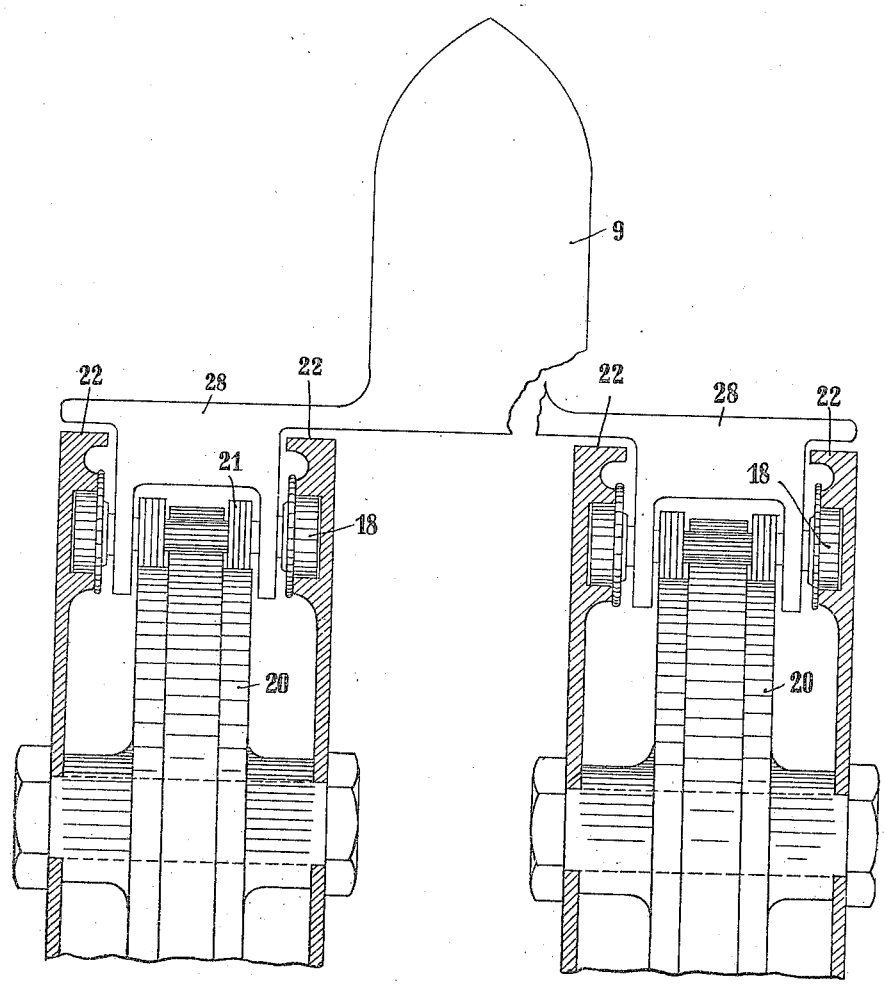

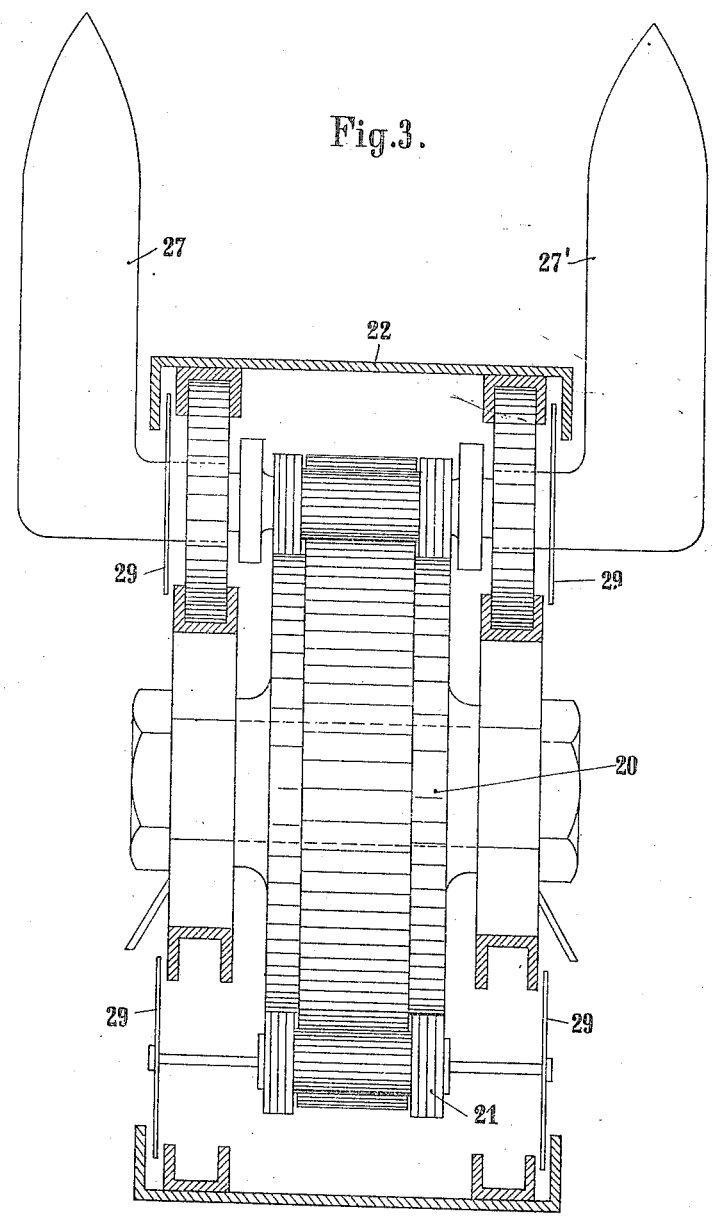

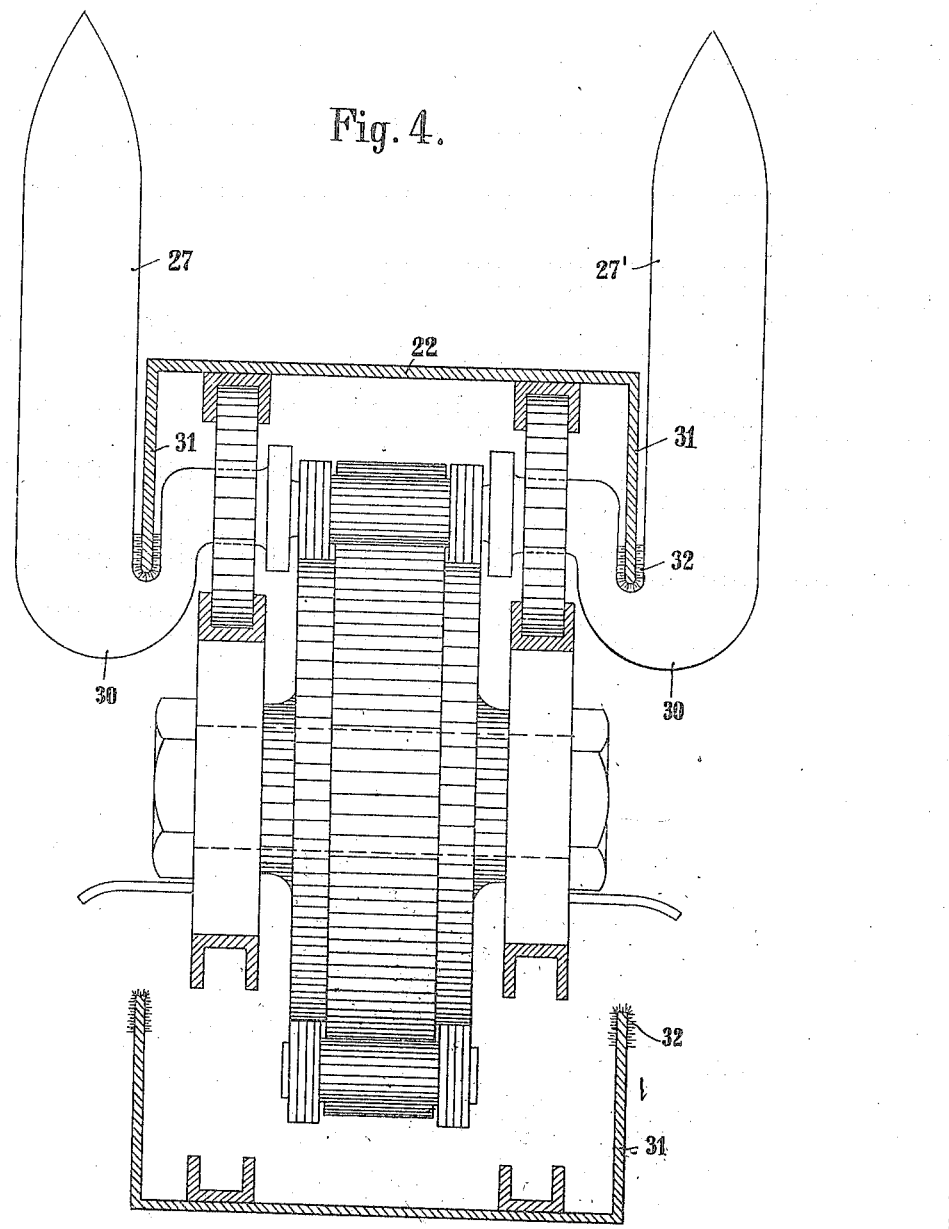

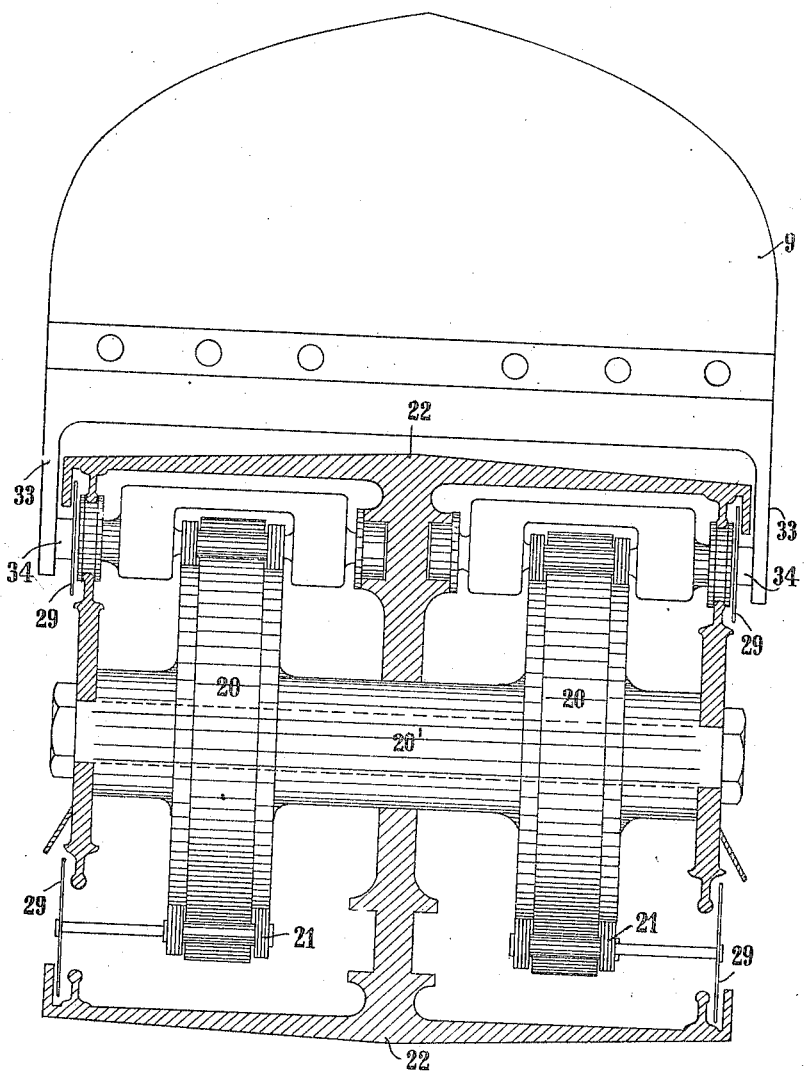

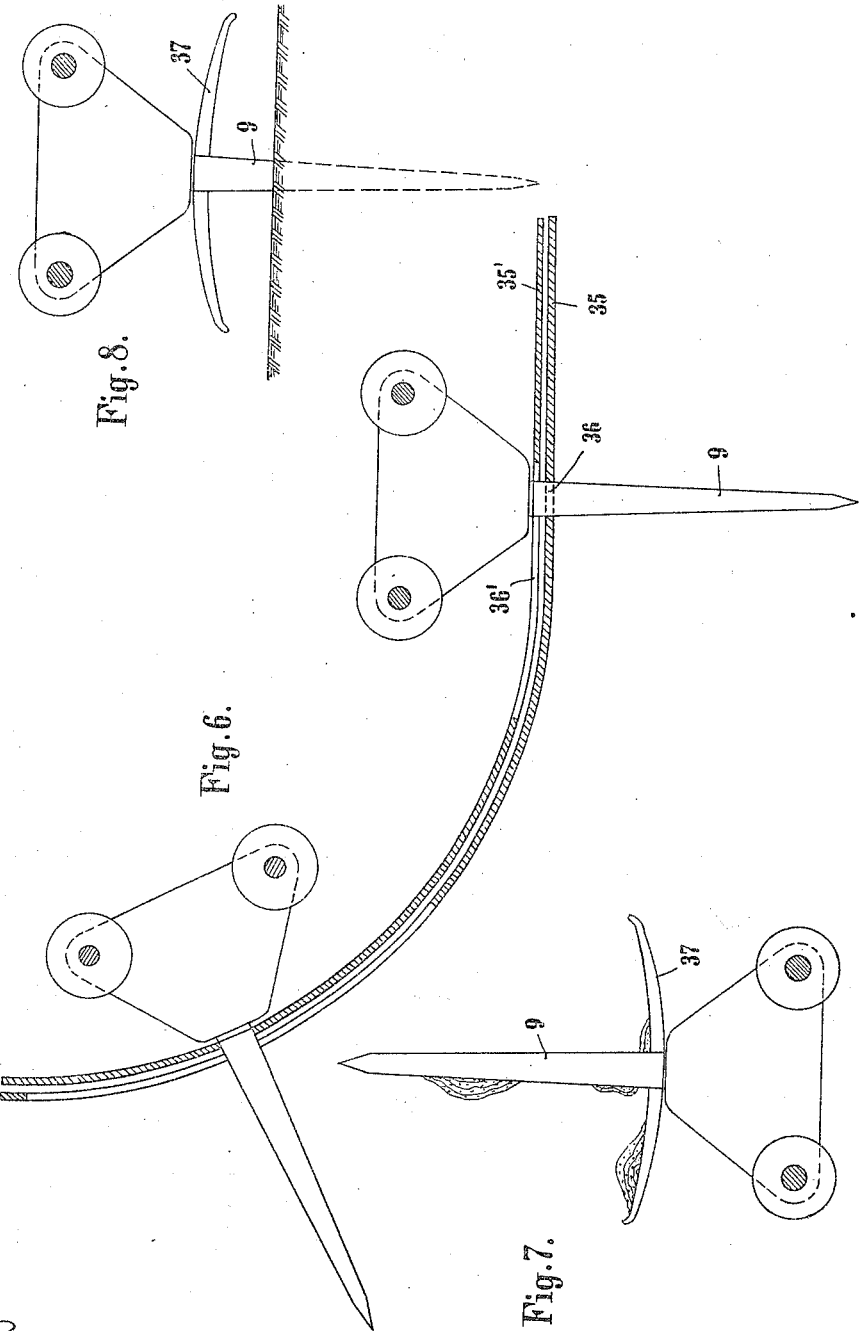

CLAUS HINRICH KÖHN, OF LEIPZIG, GERMANY, ASSIGNOR TO M. BROCKMANN, CHEMISCHE FABRIK M. B. H., OF LEIPZIG-EUTRITZSCH, GERMANY, A CORPORATION OF GERMANY.

MOTOR-PLOW.

1,180,854.   Specification of Letters Patent.   Patented Apr. 25, 1916.

Original application filed October 17, 1913, Serial No. 795,695. Divided and this application filed June 26, 1914. Serial No. 347,415.

*To all whom it may concern:*

Be it known that I, CLAUS HINRICH KÖHN, a citizen of the German Empire, and residing at Leipzig, Germany, have invented certain new and useful Improvements in Motor-Plows, of which the following is a specification.

This invention relates to motor plows of the type described in my copending patent application Serial No. 795,695, filed October 17, 1913, from which this application has been divided out.

In motor plows of the type in question raising of earth by the anchors is avoided as much as possible by inserting the anchors straight into and removing the same straight from the ground.

A primary object of this invention is to protect the driving chains as much as possible from any soil which is nevertheless carried up by the anchors and falls off therefrom when they move with the upper side of the chain.

According to my invention the anchors are made of an improved shape such that any earth which falls off the flukes when the anchors are moving with the upper side of the chain falls outside the one or more chains. I also provide improved guards for the one or more chains.

To these ends the invention consists in the construction, arrangement and combination of parts described hereinafter and pointed out in the claims.

Several embodiments of the invention are diagrammatically represented by way of example in the accompanying drawings, wherein:—

Figure 1 is a section showing the guards or covers for the chain when the anchors are forked and their heads are driven with only one chain, and Fig. 2 is a like view showing a spade-shaped anchor to be driven by two driving chains, and guards for the latter; Fig. 3 is a like view showing another form of a forked anchor to be driven by a single chain, and a guard for the latter; Fig. 4 is a like view showing another form of a forked anchor driven by a single chain, and a modified guard for the latter, and Fig. 5 is a like view showing a second form of a spade-shaped anchor driven by two chains, and a modified guard for the latter; Fig. 6 shows an improved form of a covering band or belt comprising a number of overlapping, relatively displaceable parts for equalizing the varying distance apart of the anchors, and Figs. 7 and 8 are elevations showing in two different positions of the anchor, the arrangement of a guard for collecting any earth which may fall off the anchor when it is directed vertically upward, while when the anchor is directed downward the soil can fall off the guard on to the ground.

Referring firstly to Figs. 1 to 5, the chains are so arranged that they are located completely outside the range of soil falling from the flukes.

In the embodiment shown in Fig. 1 the numeral 20 designates the sprocket-wheel which rotates about a fixedly mounted pivot 26 and drives by means of the chain 21 the head of the anchor having the rollers 18 which run in the guides 17. The anchor 9ª itself is fork-shaped, and its flukes 27, 27′ are so far apart that they enter into the ground outside the planes containing the chain 21 and the rollers 18. In addition, side pieces or flanges 22 prevent any earth thrown off laterally from the flukes 27, 27′ entering into the guide-ways 17.

In the embodiment shown in Fig. 2, instead of a forked anchor I provide an anchor having an ordinary spade-shaped fluke 9, but the driving chains 21 driven by sprocket-wheels 20 are disposed laterally outside the reach of soil thrown vertically up or down by the fluke 9. The anchor has lateral heads 28 by means of which it is carried by the rollers 18. Here again the flanges or side pieces 22 prevent any dirt thrown off laterally from the flukes entering into the guides or chains.

In contradistinction to the form shown in Fig. 1, in the embodiment according to Fig. 3 the flukes 27, 27′ of the anchor project laterally out of the guide-ways and embrace the plates 22 connected to the guideways and completely covering the chains and guide-ways, and, in addition lateral washers or disks 29 mounted on the anchors or on the pins of the chain protect the guide-ways from dirt which is thrown laterally off the flukes.

In the illustrative embodiment according to Fig. 4, instead of the washers or disks 29 (Fig. 3) for protecting the guide-ways the flukes 27, 27' of the anchor have a U-bend 30 into which flanges 31 of the cover plates 22 enter. The ends of these flanges may be formed as brushes 32 so that dirt which falls into these bent portions is swept out.

In the illustrative embodiment according to Fig. 5, the numeral 20 again designates the sprocket-wheels which are mounted on a common axle 20' and which rotate about a fixed pivot and drive the chains 21. Each pin of these chains drives an anchor 9ᵇ. 22 designates the cover plates for the guides; the anchor itself is spade-shaped and provided with lateral arms 33 carried by the pins 34 projecting out of slots in the guideway. The lateral slots may be protected from dirt thrown off laterally from the anchors by washers or disks 29 mounted on the pins 34 or on the pins of the chains.

In the illustrative embodiment according to Fig. 6 the protection from dirt is afforded by a rotating band which consists, however, not of one uniform piece of material, but of several overlapping parts 35, 35' which are provided with holes 36 and slots 36' so that the parts 35, 35' can shift relatively to one another, but the band nevertheless always affords proper protection.

Lastly, Figs. 7 and 8 show another kind of protection for the guide-ways and chains, each anchor 9 being provided with a guard or shield 37 fixed to it in such manner that when the anchor is directed vertically upward any dirt carried by it falls onto the shield or guard and is thrown off when the anchor is directed downward.

I claim:—

1. In a car for driving a plow, the combination of a plurality of fluked anchors; means for guiding the same and inserting into and withdrawing them from the soil; and a pair of relatively shiftable bands having holes and slots therein, each anchor fluke penetrating through a hole of one band and a corresponding slot of the other.

2. In a car for driving a plow, the combination of endless guide-ways, anchors, rollers on the anchors guided in the guideways, an endless chain for driving the anchors, each anchor being fork-shaped and having its flukes located outside the vertical plane containing said chain, and guards carried by the guide-ways for said chain and said rollers.

3. In a car for driving a plow, the combination of endless guide-ways, anchors, rollers on the anchors guided in the guideways, an endless chain for driving the anchors, each anchor being fork-shaped, having a U-bend in each limb and having its flukes located outside the vertical plane containing said chain, and guards for said chain and said rollers extending into the U-bends.

4. In a car for driving a plow, the combination of endless guide-ways, anchors, rollers on the anchors guided in the guideways, an endless chain for driving the anchors, each anchor being fork-shaped, having a U-bend in each limb and having its flukes located outside the vertical plane containing said chain, and guards for said chain and said rollers extending into the U-bends, the ends of the guards in the U-bends being formed as brushes.

In testimony whereof, I affix my signature in the presence of two witnesses.

CLAUS HINRICH KÖHN.

Witnesses:
RUDOLPH FRICKE,
ALICE DUNGER.